Figure 1:
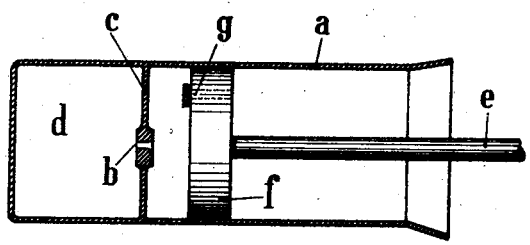

Dec. 15, 1925.

O. FINKHAUS

PNEUMATIC BUFFER

Filed Aug. 2, 1924

Inventor:
Oskar Finkhaus.
by W. Schoenborn.
Attorney

Patented Dec. 15, 1925.

1,566,190

UNITED STATES PATENT OFFICE.

OSKAR FINKHAUS, OF WURZBURG, GERMANY, ASSIGNOR TO BOHN & HERBER, MASCHINENFABRIK UND EISENGIESSEREI, OF WURZBURG, BAVARIA, GERMANY, A KOMMANDITGESELLSCHAFT OF GERMAN LAW.

PNEUMATIC BUFFER.

Application filed August 2, 1924. Serial No. 729,814.

*To all whom it may concern:*

Be it known that I, OSKAR FINKHAUS, a citizen of Deutsches Reich, and residing at 34 Petrinistreet, Wurzburg, Bavaria, Germany, have invented certain new and useful Improvements in Pneumatic Buffers, of which the following is a specification.

Pneumatic buffers are frequently employed for ensuring the easy reversal of a reciprocating body in machines of various kinds, more particularly in printing machines. When the machines change their speed, the retardation and acceleration forces caused by the reversal of the reciprocating body, also change at the same time. In printing machines to which this invention more particularly refers, the pneumatic buffer cylinders are generally firmly secured to the machine bed, and the pneumatic buffer pistons or plungers are connected by piston rods to the reciprocating carriage. Before the stroke is reversed, the piston penetrates into the cylinder and compresses the air contained therein. In this way the moving body, that is to say the carriage is retarded until it stops at the point of reversal of its movement. After the change of stroke or reversal, the air pressure in the cylinder again assists in accelerating the carriage in the opposite direction.

If a printing machine, the pneumatic buffers of which ensure correct balancing of the masses for a given speed of the machine, is working at a reduced speed, the free mass-forces are absorbed before the stroke is reversed. In this moment a change of pressure in the driving gearing takes place and the carriage is pushed on to the change of stroke by the driving force, afterwards it returns with an excessive acceleration which again causes a second inopportune change of speed. If on the contrary the printing machine is working at a higher speed than that at which the pneumatic buffers ensure correct balancing of the masses, there will remain, at the point of reversal, unbraked mass forces which will cause a shock in the driving, which will be repeated immediately afterwards, as the air pressure in the buffer will not be sufficient to accelerate the carriage in the opposite direction. Both at the higher and at the lower speed, the mass forces will therefore exercise a jerky action on the bearing of the reversing crank and on the driving gear.

The well known devices for adjusting the pneumatic buffers to the changing speed of the machine have the drawback that they require an adjustment at every change of speed, either by hand or by an automatically acting governor.

This invention provides a pneumatic buffer, the braking power of which is automatically adapted, without any adjustment, to the mass forces of the reciprocating masses, which forces change with the speed of the machine. It consists in providing, in the pressure space or chamber of the buffer, an air outlet opening which is so narrow that a change in the speed with which the buffer piston enters the cylinder, produces also a change in the pressure in the buffer space. The air outlet of the buffer cylinder preferably leads into a second closed chamber. The construction could also be such that one or more such air outlet openings are distributed along the casing of the buffer cylinder so that they are closed by the buffer piston or plunger after it has travelled a certain distance.

Figure 2:
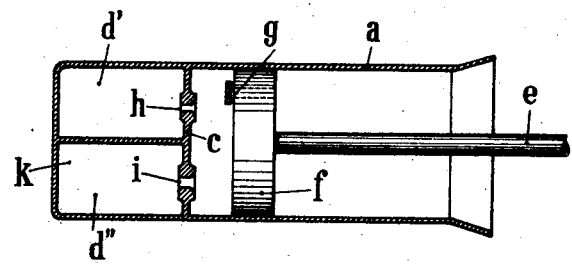
Figure 3:
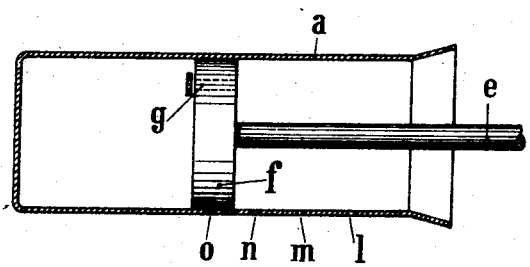

The drawing shows diagrammatically in Figures 1, 2 and 3 three constructions according to the invention, in longitudinal section.

From the buffer cylinder $a$, Figure 1 an opening $b$ in the cover $c$ leads into a closed chamber $d$. The piston $f$ connected by the piston rod $e$ to the reciprocating mass of a machine not shown in the drawing, has as usual a check or non-return valve $g$. The opening $b$ is so narrow that it strongly throttles the passage of the air in the case of the pressures under consideration; consequently, the quantity of the air passing through the opening varies in accordance with the time which is available for the passage of the air, that is to say in accordance with the time which the piston $f$ takes in order to travel from the moment of entering the buffer cylinder to the point of reversal and from the point of reversal back to the point of leaving the buffer cylinder. The pressure in the buffer space varies therefore with the speed of the reciprocating mass.

The operation of the pneumatic buffer shown in Figure 1, is as follows:

When the piston $f$ enters the buffer cylinder $a$, the air in the latter is compressed; a portion of the air passes into the chamber $d$ situated at the back; owing to the throttling action of the opening $b$, the air pressure in the chamber $d$ does not however rise to the same extent as in the buffer cylinder $a$. On the other hand, the air pressure in the buffer cylinder does not rise as strongly as would be the case if the opening into the rear chamber and this chamber were not provided. As the quantity of the air passing through the opening $b$ depends on the time available, the pressure acting on the piston in the case of a slower speed of the piston $f$ will be smaller in every position, and in the case of a higher speed, it will be higher. The buffer or braking action varies therefore automatically according to the speed of the piston and therefore according to that of the reciprocating mass. At the moment of reversal of the piston, the pressure in the buffer cylinder will be higher in the case of a higher speed, and lower in the case of a slower speed, so that in any case the reversal will take place smoothly at the dead centre, with change of pressure. After the reversal of the movement, the pressure at any speeds will be sufficient to accelerate the reciprocating mass on its return. The pressure acting on the piston $f$, in the case of a higher speed of the piston $f$, drops more slowly than in the case of a slower speed, as long as the pressure in the chamber $d$ and in the pressure chamber of the buffer cylinder $a$ remains the same. The further behaviour of the pneumatic buffer does not affect the action, for the reciprocating mass is then already accelerated, and receives its further motion from the driving gear. The shape and size of the opening $b$ are calculated so that the pneumatic buffer produces a perfect balancing of the mass actions at any speed of the reciprocating masses within the limits in question.

In the construction shown in Figure 2 two openings $h$ and $i$ of different size lead from the buffer cylinder $a$ into the chamber $d$. The latter is divided into two chambers $d'$ and $d''$ which are separated from each other by a partition $k$. The volumes of the chambers can be the same or different. This construction allows of a greater deviation of the highest and lowest speed of the reciprocating masses with perfect action of the pneumatic buffer, and facilitates an exact calculation of the required throttling action of the openings $h$ and $i$. It also makes it possible to exercise a greater influence on the air pressure in the buffer cylinder, than the construction shown in Figure 1.

On the other hand, it is also possible to allow the air from the buffer cylinder to escape through the throttling openings direct into the atmosphere. In such a case, the gradation of the accelerating forces after the reversal of the carriage, corresponds equally perfectly to the speed of the reciprocating masses, like the gradation of the retardation forces before the reversal. An example of such a construction is shown in Figure 3. In the casing of the cylinder $a$ are arranged four different small openings $l$, $m$, $n$, and $o$. On the piston $s$ getting into the buffer cylinder $a$, the said openings are successively shut off by the piston from the pressure chamber of the buffer cylinder and thus rendered inoperative. When the fourth opening $o$ is closed, the pressure in the pressure chamber of the buffer cylinder will have a value which, in the case of a higher speed of the reciprocating mass, will be higher, and in the case of a lower speed, will be lower, so that in that way the desired result will be ensured.

The invention described may be modified in many ways, and I do not limit my claim to the constructions illustrated. For instance, a construction in which the opening in the pneumatic buffer would be connected by a pipe to the chambers would fall within the scope of the invention.

Having now particularly described and ascertained the nature of my said invention and in what manner the same is to be performed I declare that what I claim is:—

1. A pneumatic buffer for absorbing mechanical shocks of a reciprocating body more particularly applicable to printing machines, consisting of a piston adapted to be connected with a reciprocating body and of a corresponding cylinder receiving said piston, one or more small openings being provided in the pressure chamber of the cylinder, said openings so constructed, arranged and adapted to produce a change of pressure in said cylinder on a variation of speed of the reciprocating body and retain said pressure in the cylinder sufficient to accelerate the return speed of the reciprocating body.

2. A pneumatic buffer for absorbing mechanical shocks of reciprocating bodies more particularly applicable to printing machines, consisting of a piston and of a corresponding cylinder, one or more openings being provided in the pneumatic buffer portion which limit the pressure in the chamber until the reversal of stroke, which openings are so small that a change of the speed of the reciprocating body produces also a change in the pressure in the buffer cylinder, chambers being provided of the same number as the said openings, which chambers are placed in communication with the pressure chamber by the openings.

3. A pneumatic buffer for absorbing mechanical shocks of reciprocating bodies more particularly applicable to printing machines, consisting of a piston and of a corresponding cylinder, several small openings and chambers of the same number as the said openings being in communication with the pressure chamber.

4. A pneumatic buffer for absorbing mechanical shocks of a reciprocating body more particularly applicable to printing machines, consisting of a piston adapted to be connected with a reciprocating body and of a corresponding cylinder receiving said piston, one or more small openings of various sizes provided in the casing of the cylinder, said openings so constructed, arranged and adapted to be over run by the piston before the reversal or return stroke of said piston.

Signed at Wurzburg this 19th day of May, 1924.

OSKAR FINKHAUS.